United States Patent [19]

Rugg

[11] Patent Number: 5,427,694

[45] Date of Patent: Jun. 27, 1995

[54] PROCESS FOR DELIVERING A SELECTED EFFECTIVE AMOUNT OF A DRY GRANULAR ANTIMICROBIAL COMPOSITION TO AN AQUEOUS SYSTEM

[75] Inventor: LeRoy E. Rugg, Moon Township, Pa.

[73] Assignee: Calgon Corporation, Pittsburgh, Pa.

[21] Appl. No.: 90,222

[22] Filed: Jul. 8, 1993

[51] Int. Cl.⁶ .............................................. C02F 1/50
[52] U.S. Cl. .................................... 210/754; 210/755; 210/756; 210/764; 222/1; 222/450; 222/644; 422/28; 422/37
[58] Field of Search ...................... 210/198.1, 206, 749, 210/758, 754, 755, 756; 222/1, 185, 450, 460, 504, 644; 422/28, 37

[56] References Cited

U.S. PATENT DOCUMENTS

| | | | |
|---|---|---|---|
| 2,694,515 | 11/1954 | Green | 222/460 |
| 2,806,639 | 9/1957 | Halverson | 222/450 |
| 3,218,175 | 11/1965 | Siegel et al. | 222/460 |
| 3,300,094 | 1/1967 | Rockola | 222/460 |
| 3,347,741 | 10/1967 | Hutchison | 222/450 |
| 3,626,972 | 12/1971 | Lorenzen . | |
| 3,710,817 | 1/1973 | Lorenzen . | |
| 4,538,744 | 9/1985 | Weissenborn | 222/644 |
| 4,912,681 | 3/1990 | Halsey et al. | 222/450 |
| 4,938,385 | 7/1990 | Hayashi | 222/644 |
| 5,275,215 | 1/1994 | Derby | 222/450 |

Primary Examiner—Neil McCarthy
Attorney, Agent, or Firm—Craig G. Cochenour

[57] ABSTRACT

A process for delivering a selected effective amount of a dry granular antimicrobial composition to an aqueous system is provided comprising (a) adding the composition into sealed rigid container means, wherein the container means has at least one resealable opening; (b) establishing sealed communication of at least one of the resealable opening(s) with discharge means for effecting the delivery of the composition from the container means to the aqueous system wherein the discharge means has discharge valve means for effecting the discharge of the selected effective amount of the composition from the discharge means; (c) removing at least one seal from at least one of the resealable opening(s) that is in sealed communication with the discharge means for effecting the discharge of the composition through this resealable opening(s), and into the discharge means; (d) operating the discharge valve means for effecting the discharge of the selected effective amount of the composition from within the discharge means and through an open discharge valve means for delivery to the aqueous system; (e) completing at least one operation of the discharge valve means for establishing at least one cycle of delivery of the selected effective amount of the composition to the aqueous system; and (f) effecting mixing and/or dissolution of the composition in the aqueous system.

18 Claims, 3 Drawing Sheets

PROCESS FOR DELIVERING A SELECTED EFFECTIVE AMOUNT OF A DRY GRANULAR ANTIMICROBIAL COMPOSITION TO AN AQUEOUS SYSTEM

BACKGROUND OF THE INVENTION

1. Field of the Invention

This invention relates to a process for delivering a selected effective amount of a dry granular antimicrobial composition to an aqueous system.

2. Brief Description of the Background Art

Aqueous water systems are susceptible to microbiological growth such as for example bacteria, yeast, fungi and algae. This microbiological growth presents a problem to many industrial and commercial applications, and more specifically includes, but is not limited to the fouling of the components of cooling water systems. Aqueous systems that become infected with microorganisms experience substantial impairment of their efficiency when deposits of the microorganisms build up in the system. These deposits coat the walls of heat exchangers and other vessels, machinery and other processing equipment employed, thus eventually creating blockages in and/or reducing heat transfer.

A variety of processes have been proposed to introduce a biocidal agent to an aqueous system for controlling this microbiological growth. It is generally well known by those skilled in the art to introduce a biocide into an aqueous system by manually dumping a quantity of a granular biocide, such as for example bromine or chlorine, to a vessel, and employing dissolve/erosion type feeders such as for example a flow through feeder.

The manual dumping process has numerous drawbacks including exposing personnel to potentially hazardous chemicals. Another drawback associated with the manual dumping process is the deterioration of activity of the biocide when the dry granular biocide is exposed to ambient humidity.

It is well known by those skilled in the art that dissolve/erosion type feeders are employed to introduce low solubility bromine biocides to aqueous systems. Generally, the dissolve/erosion feeder operates by establishing a flow of water through the feeder to cause surface friction between adjacent biocide granules or tablets thus eroding the surface thereof and dissolving the displaced particles. The dissolve/erosion type feeders have several drawbacks. Because the rate of dissolution of the biocide granule or tablet is dependent upon the water temperature and the rate of flow of the water, it is difficult to monitor the amount of biocide introduced to the aqueous system. At higher water flow rates, the rate of erosion exceeds the rate of dissolution of the displaced biocide particles, thus resulting in undissolved biocide entering the aqueous system. This latter limitation substantially prevents increasing the amount of biocide that may be added to the aqueous system in response to an isolated increase in microbial growth. Another drawback of dissolve/erosion type feeders is the safety concern of generating nitrogen trihalides, such as for example nitrogen trichloride or nitrogen tribromide, from the wet oxidant under normal conditions of operation or storage. It will be appreciated by those skilled in the art that employing dissolve/erosion type feeders make it difficult if not impossible to effectively make an addition of a discrete or selected amount of a biocide to maintain a desired concentration of the biocide. An example of a dissolve/erosion type feeder is the feeder identified as Model BF-10 commercially available from Calgon Corporation, Pittsburgh, Pa., U.S.A.

U.S. Pat. No. 3,626,972 (Lorenzen) discloses a soluble granule feeder for use in swimming pools having a pump joined to suction and return lines wherein each feeder is said to comprise a mixing tank open to the atmosphere and connected to a granule supply bin. This patent states that a bypass conduit taps the return line to supply liquid from a portion of the return line flow to the mixing tank. This patent states that a mixing tank open to the atmosphere receives chlorine granules that are mixed with a measured amount of water to create a chlorine solution that is then passed through a Venturi unit to the swimming pool system. In contrast, the process of the instant invention does not employ a mixing tank or a valving cylinder responsive to a float, and eliminates the problems associated with antimicrobial compositions exposure to the atmosphere and ambient humidity. Further, the process of the instant invention delivers the antimicrobial composition in dry granular form to the aqueous system being treated.

U.S. Pat. No. 3,710,817 (Lorenzen) discloses an apparatus for adding solute to a liquid such as swimming pool water in which a first mixing tank is supported on a second mixing tank, each of which is connected to the water circulating system of the pool. This patent states that the apparatus comprises a first mixing tank, a second mixing tank, means for bypassing a portion of the recirculating water into the bottom of the first mixing tank, means controlling the water level within the first mixing tank at which water is transmitted into the second mixing tank, and means for connecting the second mixing tank to suction means such as a circulation pump or a venturi in the pump line such that the second mixing tank has a float controlled valve which releases the water and solute to the suction side of the venturi or pump. This patent states that the means for controlling the water level within the first mixing tank effects the dissolution of the proper number of soluble chlorine cakes within the first mixing tank that are exposed to circulating water for the period that the pump is turned on. This patent states that the number of chlorine cakes exposed to the water at any one time determines the concentration of the chlorine delivered to the second tank.

In spite of this background material, there remains a very real and substantial need for a process for delivering a selected effective amount of a dry granular antimicrobial composition to an aqueous system. More specifically there is a substantial need for a process for safely delivering, with substantially no human exposure, a selected effective amount of a dry granular antimicrobial composition to an aqueous system and a process wherein the amount of biocide remaining in inventory may be determined. Further, there is a very real and substantial need for a process of delivering a selected effective amount of a dry granular antimicrobial composition to an aqueous system wherein the delivery of the dry granular antimicrobial composition to the aqueous system is not affected by a specific amount of water, water flow rate or temperature. Additionally, there remains a need for a process for delivering a dry granular antimicrobial composition to an aqueous system wherein the effective quantity of the dry granular antimicrobial composition delivered may be varied over a broad effective range with a single operation.

SUMMARY OF THE INVENTION

Figure 1:
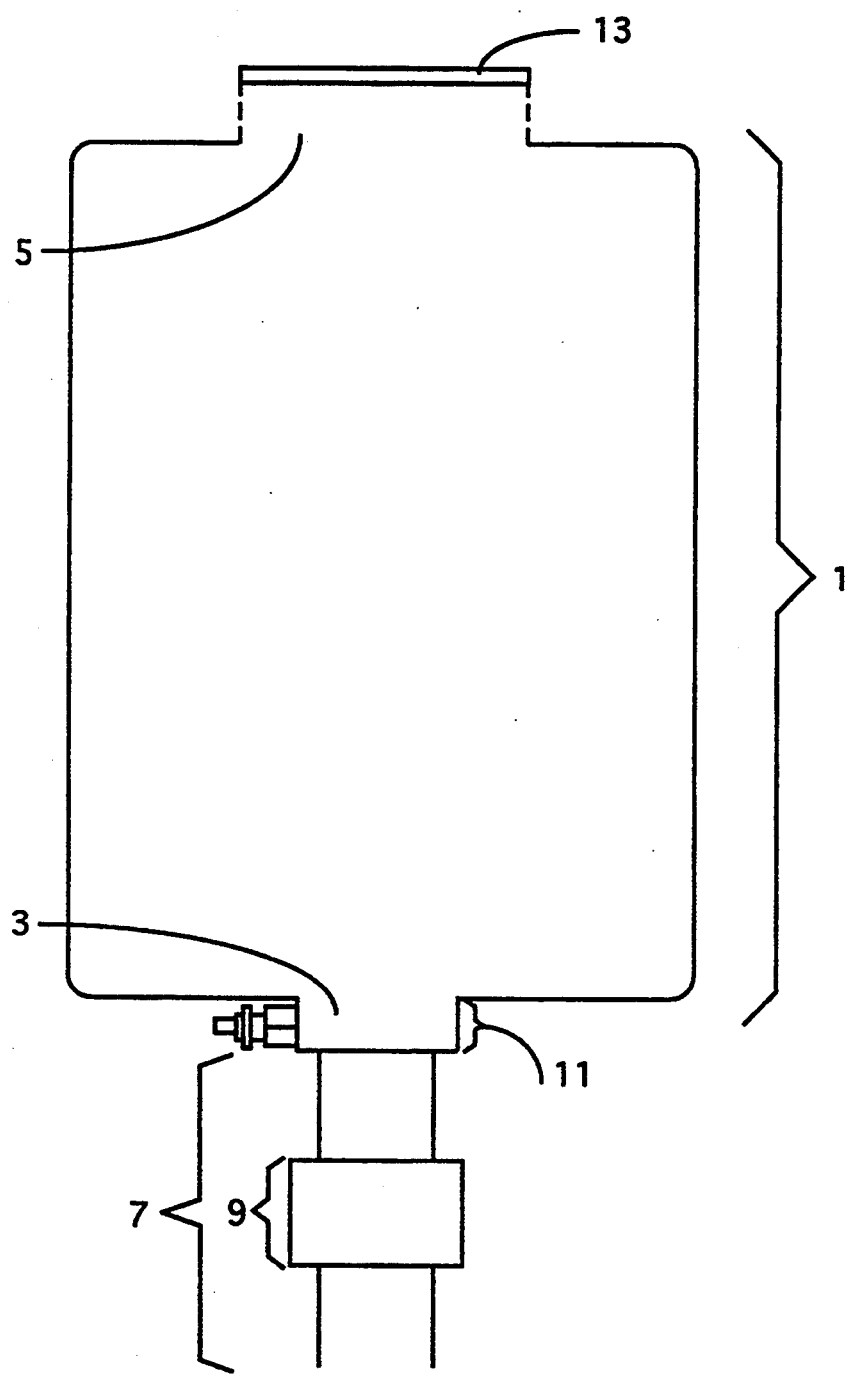
FIG. 1 shows one arrangement of the sealed rigid container means, discharge means, resealable openings(s) and discharge valve means employed in the process of the present invention.

The present invention has met the above-described needs. The present invention provides a process for delivering a selected effective amount of a dry granular antimicrobial composition to an aqueous system comprising (a) adding the dry granular antimicrobial composition into sealed rigid container means for containing the dry granular antimicrobial composition, wherein the sealed rigid container means has at least one resealable opening for permitting addition to and discharge from the sealed rigid container means, (b) establishing sealed communication of at least one of the resealable opening(s) of the sealed rigid container means with discharge means for effecting the delivery of the dry granular antimicrobial composition from the sealed rigid container means to the aqueous system, wherein the discharge means has discharge valve means for effecting discharge of the selected effective amount of the dry granular antimicrobial composition from the discharge means, (c) removing at least one seal from at least one of the resealable opening(s) of the sealed rigid container means that is in sealed communication with the discharge means for effecting the discharge of the dry granular antimicrobial composition from the sealed rigid container means through at least one of the resealable opening(s) in sealed communication with the discharge means, and into the discharge means, (d) operating the discharge valve means for effecting the discharge of the selected effective amount of the dry granular antimicrobial composition from within the discharge means and through an open discharge valve means for delivery to the aqueous system, (e) completing at least one operation of the discharge valve means for establishing at least one cycle of delivery of the selected effective amount of the dry granular antimicrobial composition to the aqueous system, and (f) effecting mixing and/or dissolution of the dry granular antimicrobial composition in the aqueous system.

Another embodiment of this invention provides a process, as mentioned hereinabove and described herein, including repeating steps (d), (e), and (f) for effecting the delivery of the selected effective amount of the dry granular antimicrobial composition to the aqueous system for achieving an effective microbial inhibitory concentration.

In a preferred embodiment of this invention, the process, as mentioned hereinabove and described herein, includes wherein the selected effective amount of the dry granular antimicrobial composition delivered per cycle of operation and completion of operation to the aqueous system is at least about 0.10 pounds, more preferably from about 0.10 to 100 pounds, and most preferably about 10 pounds.

DETAILED DESCRIPTION OF THE INVENTION

The instant invention is directed to a process for delivering a selected effective amount of a dry granular antimicrobial composition to an aqueous system.

As used herein, the terms "antimicrobial", "biocide", or "biocidal agent" refer to compositions employed for killing, as well as the inhibition of or control of the growth of a microorganism, such as for example, bacteria, yeasts, fungi, or algae, and combinations thereof.

As used herein, the term "effective amount" refers to that amount of a dry granular antimicrobial composition necessary to bring about a desired result, such as but not limited to killing, inhibiting or controlling the growth of a microorganism.

As used herein, the term "aqueous system" includes, but is not limited to, water carrying systems such as for example a cooling system (including for example a cooling tower), means for heat exchange, means for industrial and/or commercial processing or scrubbing, or a body of water such as for example a lake, pond or stream.

As used herein, the term "granular" means a particle, such as for example but not limited to, having a size ranging from about a powder to about a coarse granule, as generally understood by those skilled in the art. It will be appreciated by those skilled in the art, however, that while it is preferable that each particle employed in the process of the instant invention has a size ranging from about a powder to a coarse granule, the size of the particle is generally unimportant relative to the process of the present invention.

The present invention provides a process for delivering a selected effective amount of a dry granular antimicrobial composition to an aqueous system comprising (a) adding the dry granular antimicrobial composition into sealed rigid container means 1, as shown in FIG. 1, for containing the dry granular antimicrobial composition, wherein the sealed rigid container means 1 has at least one resealable opening 3 and/or 5 for permitting addition to and discharge from the sealed rigid container means 1; (b) establishing sealed communication of at least one of the resealable opening(s) 3 and/or 5 of the sealed rigid container means 1 with discharge means 7 for effecting the delivery of the dry granular antimicrobial composition from the sealed rigid container means 1 to the aqueous system, wherein the discharge means 7 has discharge valve means 9 for effecting the discharge of the selected effective amount of the dry granular antimicrobial composition from the discharge means 7; (c) removing at least one seal 11 from at least one of the resealable opening(s) 3 of the sealed rigid container means 1 that is in sealed communication with the discharge means 7 for effecting the discharge of the dry granular antimicrobial composition through at least one of the resealable opening(s) 3 in sealed communication with the discharge means 7, and into the discharge means 7; (d) operating the discharge valve means 9 for effecting the discharge of the selected effective amount of the dry granular antimicrobial composition from within the discharge means 7 and through an open discharge valve means 9 for delivery to the aqueous system; (e) completing at least one operation of the discharge valve means 9 for establishing at least one cycle of delivery of the selected effective amount of the dry granular antimicrobial composition to the aqueous system; and (f) effecting mixing and/or dissolution of the dry granular antimicrobial composition in the aqueous system. It will be understood that completing at least one operation of the discharge valve means 9 includes, but is not limited to, closing the discharge valve means 9. It will be appreciated by those skilled in the art that while FIG. 1 shows for purposes of illustration a particular embodiment of the instant invention wherein the placement of the resealable opening(s) 3 and 5 are positioned at the bottom and top, respectively, of the rigid container means 1, the placement of the resealable opening(s) 3 and/or 5 of the rigid container means 1 is purely arbitrary dependent only upon employing gravity to effect the discharge of the dry granular antimicrobial composition from the sealed rigid container means 1 and into the discharge means 7. Further it will be appreciated by those skilled in the art that the process of the instant invention, as described herein and as shown in FIG. 1, includes removing seal 11 from resealable opening 3 of the sealed rigid container means 1 for effecting the discharge of the dry granular antimicrobial composition from within the sealed rigid container means 1 through resealable opening 3 and into the discharge means 7.

Figure 2:
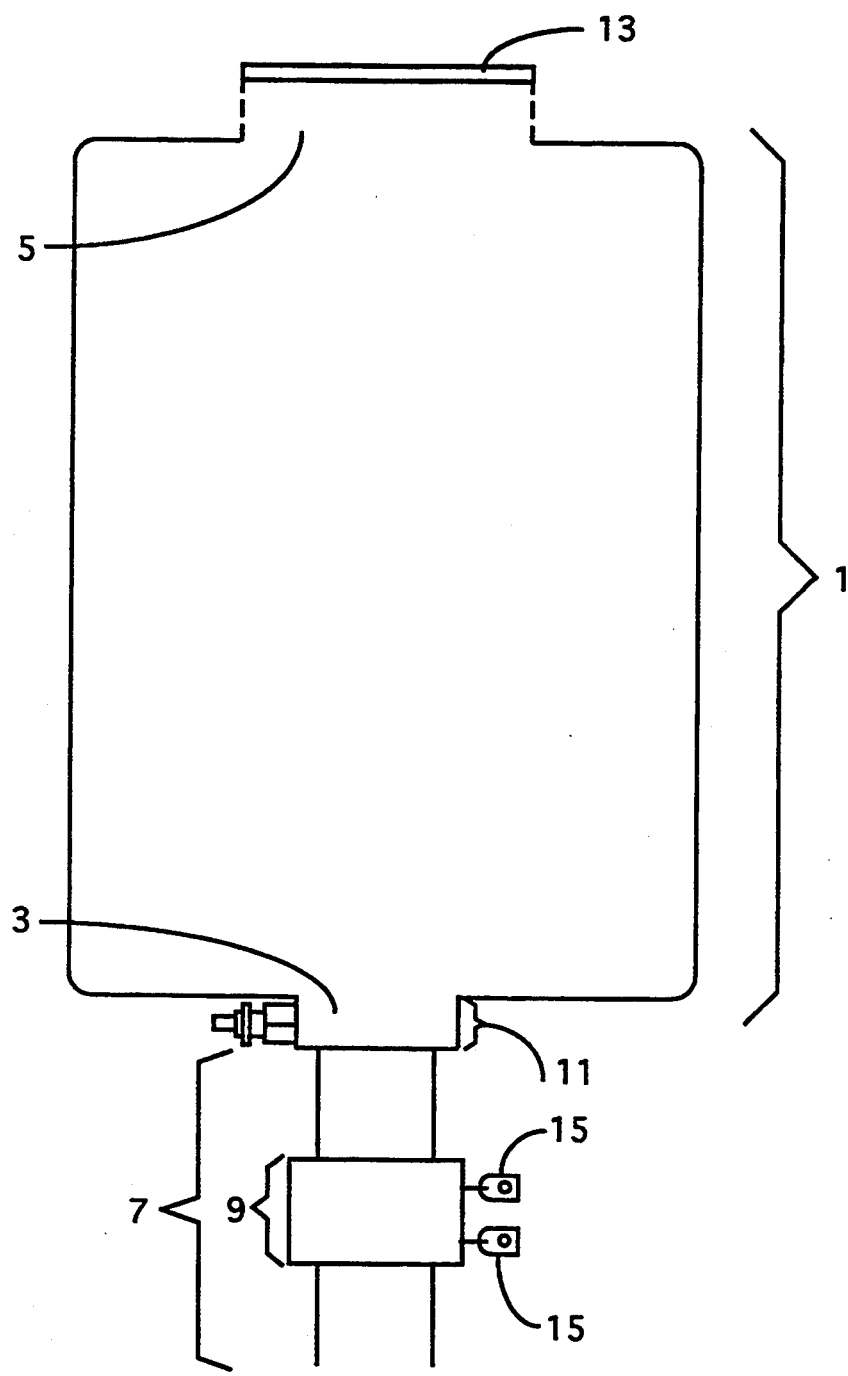
FIG. 2 shows one arrangement of the sealed rigid container means, discharge means, resealable opening(s), discharge valve means, and manual mechanical means employed in the process of the present invention.
Figure 3:
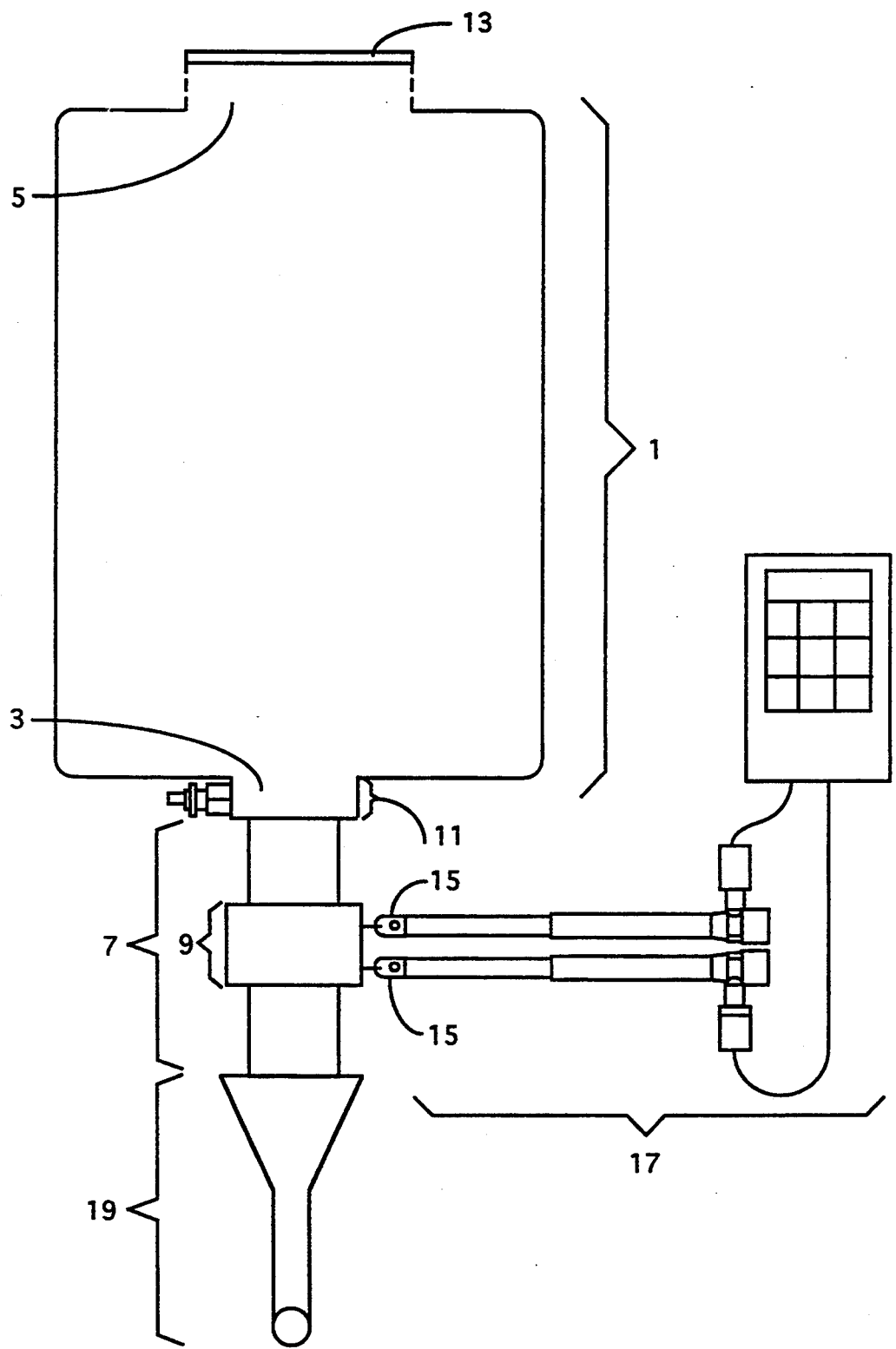
FIG. 3 shows one arrangement of the sealed rigid container means, discharge means, resealable opening(s), discharge valve means, manual mechanical means, programmable dispensing means, and eductor means employed in the process of the present invention.

It will be understood by those skilled in the art that the physical dimensions and the diameters of elements numbered 1 thru 19 of FIGS. 1, 2, or 3 as employed in the process of this invention are generally not important relative to effecting the delivery of a selected effective amount of a dry granular antimicrobial composition to an aqueous system as described herein.

In another embodiment of the present invention, a process is provided, as hereinabove described, including repeating steps (d), (e), and (f) for effecting the delivery of the selected effective amount of the dry granular antimicrobial composition to the aqueous system for achieving an effective microbial inhibitory concentration.

Another embodiment of this invention provides for the process as described hereinabove including employing manual mechanical means 15, as shown in FIG. 2, for effecting the operation and the completion of the operation of the discharge valve means 9.

In a preferred embodiment of this invention, a process is provided, as described hereinabove, including employing the discharge valve means 9 under the control of programmable dispensing means 17, as shown in FIG. 3, for controlling the number of cycles of delivery of the selected effective amount of the dry granular antimicrobial composition to the aqueous system being treated. The programmable dispensing means 17 is responsive for dispensing the selected effective amount of the dry granular antimicrobial composition. Preferably, the programmable dispensing means 17 is responsive for monitoring the amount of the dry granular antimicrobial composition within the sealed rigid container means 1. Most preferably, the programmable dispensing means 17 is responsive for monitoring the amount of the dry granular antimicrobial composition remaining within the sealed rigid container means 1 upon completing at least one cycle of delivery of the selected effective amount of the dry granular antimicrobial composition to the aqueous system being treated.

The process of this invention, as hereinabove described, includes wherein the selected effective amount of the dry granular antimicrobial composition delivered to the aqueous system is at least about 0.10 pounds per cycle of operation and completion of operation of the discharge valve means 9. Preferably, the process of this invention, as hereinabove described, includes delivering from about 0.10 to 100 pounds of the dry granular antimicrobial composition to the aqueous system per cycle of operation and completion of operation of the discharge valve means 9, and most preferably about 10.0 pounds.

It will be understood by those skilled in the art that the dry granular antimicrobial composition is a dry granular oxidant antimicrobial composition or a dry granular nonoxidant antimicrobial composition. In one embodiment of the process of the present invention, the dry granular oxidant antimicrobial composition is a biocide selected from the group consisting of sodium dichloro-s-triazinetrione, sodium bromide, and combinations thereof. In another embodiment of the process of this invention, the dry granular oxidant antimicrobial composition is calcium hypochlorite.

In a further embodiment of this invention, the process, as described herein, employs a dry granular nonoxidant antimicrobial composition, such as for example, but not limited to, tetrahydro-3,5-dimethyl-2-H-1,3,5-thiadiazine 2-thione.

It will be appreciated that the dry granular antimicrobial compositions employed by the instant process are preferably made up of particles having a size ranging from about a powder to coarse granules, as understood by those skilled in the art.

A further embodiment of the present invention provides a process as described herein wherein the sealed rigid container means 1 is transportable sealed rigid container means. It will be appreciated that the sealed rigid container means 1 is made of any suitable material including, but not limited to, aluminum, stainless steel, or plastic type vinyl polymers such as for example poly(vinyl chloride), or copolymers thereof.

It will be appreciated by those skilled in the art that the discharge valve means 9 is any suitable valve, and preferably is a valve selected from the group consisting of a rotary air lock valve, a star valve, a plug valve, a ball valve, a slide valve, a plunger valve, and a butterfly valve, and combinations thereof.

In another embodiment of this invention, a process is provided as described herein including providing eductor means 19, as shown in FIG. 3, for transporting the dry granular antimicrobial composition from the discharge means 7 to the aqueous system, wherein the eductor means 19 is in communication with at least a portion of the discharge means 7, and wherein the portion of the discharge means 7 is located below the discharge valve means 9. Preferably, this process includes wherein the eductor means 19 provide a unidirectional flow of the granular antimicrobial composition from the portion of the discharge means 7 located below the discharge valve means 9 to the aqueous system being treated. It will be understood that the eductor means may employ, for example, air or water for effecting such unidirectional flow. It will be appreciated that when water is employed for effecting such unidirectional flow, the dry granular antimicrobial composition becomes solubilized.

Whereas particular embodiments of the instant invention have been described for purposes of illustration, it will be evident to those skilled in the art that numerous variations and details of the instant invention may be made without departing from the instant invention as defined in the appended claims.

What is claimed is:

1. A process for delivering a selected effective amount of a dry granular antimicrobial composition to an aqueous system comprising:
   (a) adding said dry granular antimicrobial composition into sealed rigid container means for containing said dry granular antimicrobial composition, said sealed rigid container means having at least one resealable opening for permitting addition to and discharge from said sealed rigid container means;
   (b) establishing sealed communication of at least one of said resealable opening(s) of said sealed rigid container means with discharge means for effecting the delivery of said dry granular antimicrobial composition from said sealed rigid container means to said aqueous system, said discharge means having discharge valve means for effecting discharge of said selected effective amount of said dry granular antimicrobial composition from said discharge means;
   (c) removing at least one seal from at least one of said resealable opening(s) of said sealed rigid container means that is in said sealed communication with said discharge means for effecting said discharge of said dry granular antimicrobial composition from said sealed rigid container means through said resealable opening(s) in communication with said discharge means, and into said discharge means;
   (d) operating said discharge valve means for effecting the discharge of said selected effective amount of said dry granular antimicrobial composition from within said discharge means and through an open discharge valve means for delivery to said aqueous system;
   (e) completing at least one said operation of said discharge valve means for establishing at least one cycle of delivery of said selected effective amount of said dry granular antimicrobial composition to said aqueous system; and
   (f) effecting mixing and/or dissolution of said dry granular antimicrobial composition in said aqueous system.

2. The process of claim 1 including repeating steps (d), (e) and (f) for effecting the delivery of said selected effective amount of said dry granular antimicrobial composition to said aqueous system for achieving an effective antimicrobial inhibitory concentration.

3. The process of claim 1 including employing manual mechanical means for effecting said operation and said completion of said operation of said discharge valve means.

4. The process of claim 1 including wherein said discharge valve means is under the control of programmable dispensing means for controlling the number of said cycles of delivery of said selected effective amount of said dry granular antimicrobial composition to said aqueous system.

5. The process of claim 4 including wherein said programmable dispensing means is responsive for dispensing said selected effective amount of said dry granular antimicrobial composition.

6. The process of claim 5 including wherein said programmable dispensing means is responsive for monitoring the amount of said dry granular antimicrobial composition within said sealed rigid container means.

7. The process of claim 1 wherein said selected effective amount of said dry granular antimicrobial composition delivered per said cycle to said aqueous system is at least about 0.10 pounds.

8. The process of claim 7 wherein said selected effective amount of said dry granular antimicrobial composition delivered per said cycle to said aqueous system is from about 0.10 to 100 pounds.

9. The process of claim 8 wherein said selected effective amount of said dry granular antimicrobial composition delivered per said cycle to said aqueous system is about 10.0 pounds.

10. The process of claim 1 wherein said selected effective amount of said dry granular antimicrobial composition is a dry granular oxidant antimicrobial composition.

11. The process of claim 10 wherein said dry granular oxidant antimicrobial composition is a biocide selected from the group consisting of sodium dichloro-s-triazinetrione, sodium bromide, and combinations thereof.

12. The process of claim 10 wherein said dry granular oxidant antimicrobial composition is calcium hypochlorite.

13. The process of claim 1 wherein said selected effective amount of said dry granular antimicrobial composition is a dry granular nonoxidant antimicrobial composition.

14. The process of claim 13 wherein said dry granular nonoxidant antimicrobial composition is tetrahydro-3,5-dimethyl-2-H-1,3,5-thiadiazine 2-thione.

15. The process of claim 1 wherein said sealed rigid container means is transportable sealed rigid container means.

16. The process of claim 1 wherein said discharge valve means is valve means selected from the group consisting of a rotary air lock valve, a star valve, a plug valve, a ball valve, a slide valve, a plunger valve, and a butterfly valve, and combinations thereof.

17. The process of claim 1 including providing eductor means for transporting said dry granular antimicrobial composition from said discharge means to said aqueous system, wherein said eductor means is in communication with at least a portion of said discharge means, and wherein said portion of said discharge means is located below said discharge valve means.

18. The process of claim 17 wherein said eductor means provides a unidirectional flow of said granular antimicrobial composition from said portion of said discharge means located below said discharge valve means to said aqueous system.

* * * * *